Figure 1:
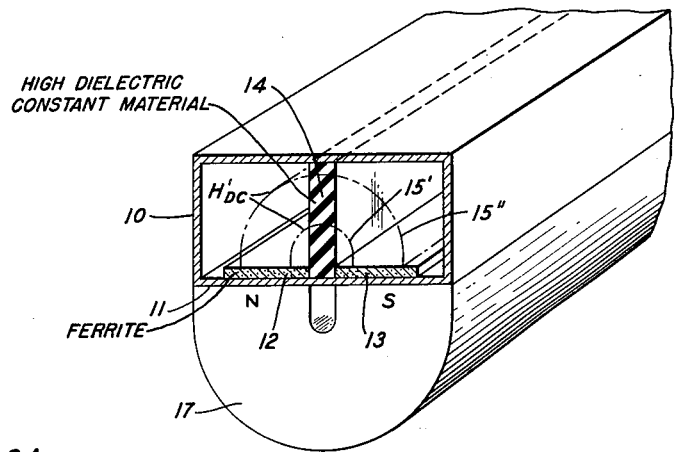

Aug. 28, 1962   W. W. ANDERSON ET AL   3,051,908
SLOW-WAVE BROADBAND NONRECIPROCAL MICROWAVE DEVICES
Filed Feb. 3, 1960   2 Sheets-Sheet 1

INVENTORS: W. W. ANDERSON
M. E. HINES
BY
Ray M. Porter Jr.
ATTORNEY

United States Patent Office
3,051,908
Patented Aug. 28, 1962

3,051,908
SLOW-WAVE BROADBAND NONRECIPROCAL
MICROWAVE DEVICES
William W. Anderson, Florham Park, and Marion E.
Hines, Summit, N.J., assignors to Bell Telephone Laboratories, Incorporated, New York, N.Y., a corporation
of New York
Filed Feb. 3, 1960, Ser. No. 6,393
11 Claims. (Cl. 330—5)

This invention relates to improved nonreciprocal gyromagnetic components for electromagnetic wave transmission systems and, more particularly, to broad band nonreciprocal attenuating devices and nonreciprocal phase shifting devices employing the gyromagnetic properties of certain gyromagnetic materials.

It has been proposed to place an element of gyromagnetic material, such as ferrite, in the path of and asymmetrically in the field pattern of electromagnetic wave energy and to bias this material to the point at which it becomes resonant in a gyromagnetic sense to the frequency of the applied wave energy. When microwaves propagating in one direction are applied to such a path they are greatly attenuated, but when they are propagating in the other direction little or no attenuation is observed. Such devices are known in the art as isolators. On the other hand, if the element is biased at a field strength other than that required for resonance, the device produces a nonreciprocal phase shift. Either as an isolator or as a phase shifter, it is often desirable that the effects for each of the respective directions be as large as possible, as greatly different from each other as possible and as independent of frequency as possible.

The devices of the preceding types derive their nonreciprocity from the fact that in a rectangular wave guide there is a plane parallel to the narrow wall thereof in which the radio frequency magnetic field of energy supported in the guide has a transverse field component and a longitudinal field component of equal amplitudes. The two components are out of phase by 90 degrees so that the net field is circularly polarized and appears to rotate in one sense for one direction of propagation along the guide and in the opposite sense for propagation in the opposite direction. Gyromagnetic material located in this plane reacts in respectively different ways with the components rotating in the opposite senses. The physical position of this plane however depends upon the frequency of the wave energy and therefore a fixed element will include a frequency dependent ratio of components that are purely circularly polarized in the desired sense and a minority of components that appear to rotate in a sense opposite to the preferred and dominating sense. Since these minority components dilute the nonreciprocal effect in the device by increasing the forward loss in an isolator and decreasing its isolation ratio, their presence renders the device highly frequency selective.

Successful but limited attempts have been made to improve this frequency sensitivity by locating an element of nonmagnetic material having a relatively high dielectric constant contiguous to the gyromagnetic element to perturb the magnetic field components of the wave that pass through it to produce additional components that increase the amount of circular polarization rotating in the predominate sense. Thus when the gyromagnetic element is properly located so that the amount of the desired circular polarization within the gyromagnetic element is increased, a corresponding increase in its nonreciprocal effect and decrease in its frequency sensitivity is observed.

Examples of this type of improvement are described in the copending application of M. T. Weiss, Serial No. 549,795, filed November 29, 1955 and in an article entitled "A High Average Power Broad-Band Ferrite Load Isolator for S-Band" by E. W. Skomal in the IRE Transactions on Microwave Theory and Techniques, January, 1959 at page 174.

The extent of improvement obtainable by the above-described effect is limited by the fact that the perturbation must remain a local effect, limited to the immediate vicinity of the dielectric loading. The loading must not cause appreciable slowing of the wave propagation which continues to have a velocity only slightly less than that of the unloaded transmission structure. If the loading is increased too much the perturbation tends to distort the field pattern in such a manner that the region of circular polarization is no longer simply defined and the orientation of the plane of polarization is not uniform.

It is an object of the present invention to further enhance and broaden the bandwidth of the nonreciprocal effect of devices employing magnetically polarized elements of gyromagnetic material.

In accordance with the present invention a transmission line is capacitively loaded by an amount so large that the velocity of propagation of wave energy therealong is slowed to a velocity several times less than the velocity in free space. It has been discovered that such a loaded transmission line will support a new mode of propagation having a radio frequency magnetic field that is substantially circularly polarized everywhere external to the loading means over a very broad band. Inhomogeneously biased gyromagnetic material of a large transverse dimension is then located in this field to provide broad band gyromagnetic effects.

In accordance with one embodiment of the invention a wave guide transmission line is capacitively loaded by dielectric material. In other embodiments the capacitive loading means comprises conductive posts or capacitive diodes. A feature of the latter embodiment resides in its suitability for use with negative-resistance amplification. Another feature of the invention resides in the use of resistive side walls for a parallel plate transmission line to stabilize the device at low frequencies.

These and other objects and features, the nature of the present invention and its various advantages, will appear more fully upon consideration of the specific illustrative embodiments shown in the accompanying drawings and described in detail in the following explanation of these drawings.

Figure 2A:
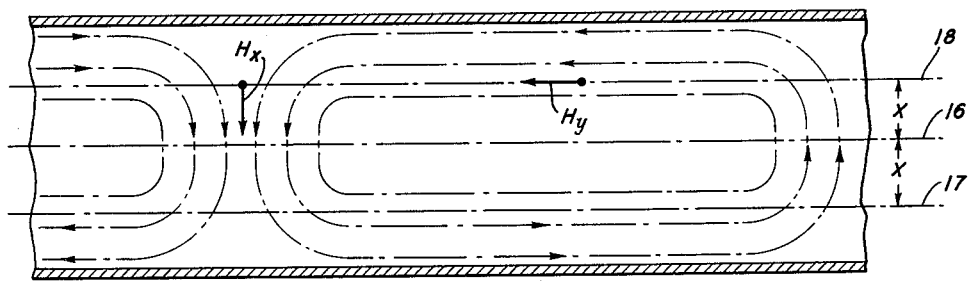
Figure 2B:
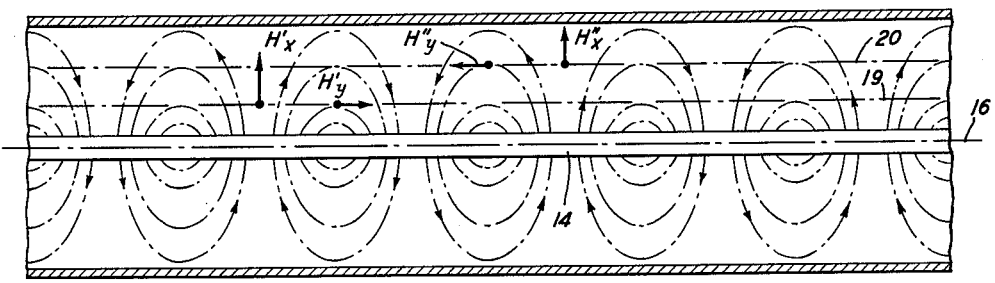
Figure 3:
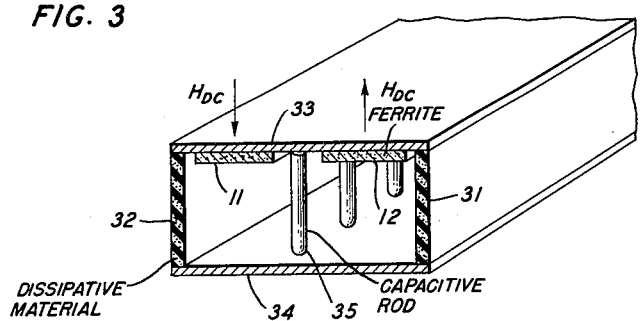
Figure 4:
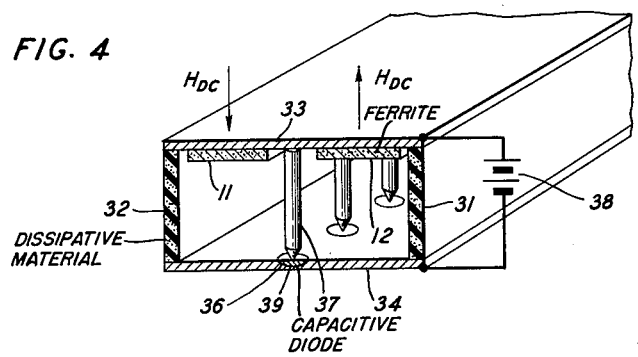
Figure 5:
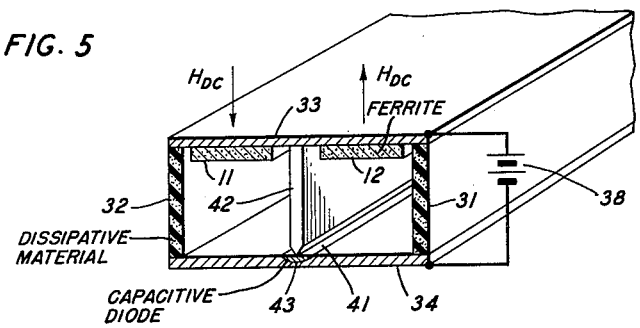

In the drawings:

FIG. 1 is a perspective view of a preferred embodiment of the invention showing the relative locations of the capacitively loading dielectric element and the gyromagnetic elements in a rectangular wave guide;

FIGS. 2A and 2B, given by way of explanation, represent the magnetic field distribution at positions across the wide dimension of an unloaded guide and of the loaded wave guide of FIG. 1, respectively; and FIGS. 3 through 5 show cross-sectional views representing modifications of the embodiment of FIG. 1.

Referring more specifically to FIG. 1 a nonreciprocal device is shown as an illustrative embodiment of the invention which may be operated either as an isolator or as a phase shifter. Initially assuming performance as an isolator, the structure comprises a section 10 of conductive rectangular wave guide which is to be interposed in the path of linearly polarized wave energy requiring isolation, such as between a source and a load. Guide 10 has conductive wide walls of internal transverse dimension of at least one-half wave length of energy to be conducted thereby and a narrow dimension substantially less than one-half of the wide dimension according to usual design considerations.

In the particular embodiment illustrated, guide 10 is capacitively loaded by locating within the guide an axially disposed, elongated element 14 of nonmagnetic, nonconductive, low loss material having a very high dielectric constant and having sufficient dimensions to decrease the velocity of propagation of wave energy within the guide several times with respect to that of an unloaded guide. In practice it has been found that material such as titanium dioxide having dielectric constants in the order of 100 to 160 is particularly suitable. Since it is preferred to have the concentration of dielectric loading as great as possible, element 14 should have a height equal to the height of guide 10 and the smallest width possible for the required degree of wave slowing. Full height is preferred also because a partial height dielectric element tends to bend and distort the field pattern in a way detrimetal to the formation of the field distribution to be defined hereinafter.

Disposed one on either side of element 14 are elongated gyromagnetic elements 12 and 13 running adjacent to the bottom wall 11 of guide 10. Elements 12 and 13 each have thin transverse cross-sections of rectangular shape with a large width dimension that is a substantial fraction of the wave guide width extending parallel to wall 11. Elements 12 and 13 extend longitudinally along guide 10 for an interval of several wave lengths. The remainder of guide 10 is filled by a dielectric medium of low dielectric constant substantially less than dielectric constant of either elements 12 or 13 or element 14, such as air.

The material of elements 12 and 13 is of the type having electrical and magnetic properties of the type described by the mathematical analysis of D. Polder in Philosophical Magazine, January 1949, volume 40, pages 99 through 115. More specifically, elements 12 and 13 may be made of any nonconducting ferromagnetic material. For example, they may comprise iron oxide with some of the oxides of one or more bivalent metals such as nickel, magnesium, zinc, manganese, and aluminum, combined in a spinel crystal structure. This material is known as a ferromagnetic spinel or as ferrite. Alternatively they may comprise one of the ferromagnetic garnet materials. Sometimes these materials are first powdered and then molded with a small percentage of a plastic binder. Hereinafter the term "ferrite" will be used exclusively as descriptive of the material but it will be understood that equivalent materials having similar gyromagnetic properties may be used to practice the invention.

Elements 12 and 13 are inhomogeneously biased or polarized in opposite directions by an externally applied transverse magnetic field at right angles to the direction of propagation of the wave energy. As illustrated, this field is supplied by a C-shaped structure comprising a magnetic core 17 having pole-pieces N and S bearing against the bottom wall 11 of guide 10. Turns of wire on core 17 may be wound and connected to a source of potential to produce a magnetizing field of this polarity or core 17 may be permanently magnetized. The distribution of the field produced by such a pole piece is nonuniform throughout the material of elements 12 and 13 because the portions thereof near the center of guide 10 have a much greater field intensity due to the shorter loop path 15' between the N and S poles than the longer loop path 15'' for portions thereof near the narrow walls of guide 10. Since elements 12 and 13 are thin and disposed on the wall 11 adjacent to the pole pieces, the field within the elements is substantially straight and normal to the magnetic plane of guide 10. The field may be provided by pole structures of other suitable physical design. In subsequent figures this field is indicated schematically by a vector labeled $H_{DC}$.

The theory and operation of the embodiment of FIG. 1 may best be explained by reference to FIGS. 2A and 2B. FIG. 2A shows the conventional high frequency magnetic field pattern of the dominant mode wave in an unloaded rectangular wave guide. The magnetic field forms loops which lie in planes parallel to the wide dimension of the guide. The amplitude of the transverse component $H_x$ of the field is zero at the narrow walls and maximum along the center plane 16 extending parallel to the narrow walls. The amplitude of the longitudinal component $H_y$ is maximum at the narrow walls and zero along center plane 16. In two particular longitudinal planes 17 and 18 displaced a distance $x$ on either side of and extending parallel to center plane 16, $H_x$ and $H_y$ are of equal amplitudes. Since these components are 90 degrees out of phase their sum produces a magnetic field that is circularly polarized and rotates in one sense in space as the wave propagates in one direction along the guide and in the opposite sense for propagation in the opposite direction. The exact position of planes 17 and 18 is a function of frequency as discussed in detail with respect to FIG. 20 in the Bell System Technical Journal, January 1955, page 50.

More specifically, the equations for the transverse component $H_x$ and the longitudinal component $H_y$ may be represented:

$$H_y = A \sin \beta x \cos (\omega t - \gamma y) \qquad (1)$$

$$H_x = \pm A \frac{1}{\sqrt{\frac{v^2}{c^2} - 1}} \cos \beta x \sin (\omega t - \gamma y) \qquad (2)$$

where $A$ is an arbitrary constant depending upon the power in the wave, $v$ is the phase velocity of the wave, $c$ is the velocity in free space, $\omega$ is the angular frequency, $t$ is the time, $\gamma$ is the longitudinal propagation constant, and $\beta$ is the transverse propagation constant. It is usual for this mode of propagation to have a phase velocity $v$ greater than the velocity of free space $c$. Circular polarization of the magnetic field requires that $$\sin \beta x = \frac{\cos \beta x}{\sqrt{\frac{v^2}{c^2} - 1}} \qquad (3)$$

and since this can occur for one value of $x$ for a given frequency, the location of the region of pure circular polarization is frequency selective and is of very narrow extent.

FIG. 2B illustrates the field pattern of the same wave energy in a wave guide of the same dimensions as that in FIG. 2A except however that the guide of FIG. 2B has been capacitively loaded in accordance with the invention by dielectric element 14 so that the propagation velocity is approximately one-third to one-fourth that of the unloaded guide of FIG. 2A.

The magnetic field still forms loops, but in the region external to the capacitive loading the shapes of the loops are vastly modified so that now in every plane at all values of $x$ away from the center plane 16, $H_x$ and $H_y$ are substantially equal to each other. These two components continue to be properly phased to produce circular polarization as the wave propagates. For example, in an arbitrary plane 19 of FIG. 2B a distance $x'$ from plane 16, $H_x'$ is nearly equal to $H_y'$ and similarly in another plane 20 at a distance $x''$ from the center greater than $x'$, $H_x''$ is nearly equal to $H_y''$. The intensity of both $H_x$ and $H_y$ decay exponentially with $x$ so that a maximum intensity occurs adjacent to element 14 and the intensity approaches zero at the narrow walls of guide 10. This condition may be defined by equations corresponding to Equations 1 and 2 as:

$$H_x = A e^{-\beta x} \cos (\omega t - \gamma y) \qquad (4)$$

$$H_y = \pm A \frac{1}{\sqrt{1 - \frac{v^2}{c^2}}} e^{-\beta x} \sin (\omega t - \gamma y) \qquad (5)$$

It will be noted that the variation with $x$ is now the same for the two components $H_x$ and $H_y$. All that is required for perfect circular polarization is that $$\frac{1}{\sqrt{1-\frac{v^2}{c^2}}} = 1 \qquad (6)$$

Obviously it is impossible to meet this condition precisely at every frequency, but for all frequencies for which $v/c$ has been made small by the capacitive loading, for example, in the order of ⅓ or less, the condition of circular polarization is very closely met. Any significant ellipticity exists only at the lower frequencies where the difference between the wave velocity and the velocity of free space is small and near the outer conductive boundary. Thus the region of significant circular polarization has been extended from a relatively narrow plane to include substantially the entire field pattern external to the loading means. Since higher frequencies are drawn within the loading means to a greater extent than the low frequency components, the former will be more concentrated in regions near the loading means while the latter will extend further toward the conductive side walls.

Thus in the embodiment of FIG. 1 the ferrite elements 12 and 13 have been given broad transverse dimensions and biased by a field more intense at the center to produce gyromagnetic resonance at the higher frequencies there concentrated and less intense in the outer portions to produce gyromagnetic resonance at the lower frequencies. Thus broad band resonance absorption is obtained according to the principles set forth in more detail in the copending application of M. L. Reeves, Serial No. 546,392, filed November 14, 1955, now Patent No. 2,948,868. Since the sense of circular polarization for the entire region reverses with a reversal in the direction of propagation, efficient, broad band nonreciprocal isolator action is obtained.

The above-defined field pattern can exist in rectangular conductively bounded wave guide in the precise form defined by Equations 4 and 5 only if the wide dimension is sufficiently large with respect to the degree of loading that the complete field pattern as shown in FIG. 2B can form without the shape of the magnetic field lines being influenced by the near presence of the narrow conductive walls. In practice, however, operation is satisfactory if these narrow walls occur only where fields of low intensity or low frequency still exist as compared with the fields predominating near the center. When either of these conditions is met, the conductive side boundaries are unnecessary except as they provide shielding from external interference and may be removed. The structure then becomes very similar to the familiar parallel plate transmission line.

However, the heavily loaded structure is capable of being excited in and supporting many undesirable spurious modes, particularly at the lower frequencies. Therefore, rather than dispense entirely with the side boundaries, it is preferable to replace them by electrically dissipative boundaries which absorb or prevent propagation of the spurious modes. This modification is illustrated in FIG. 3 in which electrically dissipative or resistive members 31 and 32, made of any suitable material such as carbon impregnated plastic, connect the opposing longitudinal edges of parallel plates 33 and 34.

FIG. 3 also illustrates an alternative form of capacitive loading which may replace the dielectric loading of FIG. 1. The illustrated alternative comprises a plurality of thin, closely spaced, conductive rods or fingers 35 extending a substantial portion of the way across the space between plates 33 and 34 from positions upon the longitudinal center line of plate 33. When properly proportioned this array introduces capacitive loading to the wave energy propagating between plates 33 and 34 and decreases its propagation velocity as required by the invention. Care should be taken in designing such an array to assure that the reactance introduced is predominantly capacitive. Other equivalent wave slowing circuits known to the art as introducing capacitive loading may be similarly used.

Another way of obtaining a high degree of capacitive loading is illustrated in FIG. 4. Here a plurality of junction diodes of any of the several types known as having a high capacitance across the junction are distributed in a longitudinally extending array between the center lines of plates 33 and 34. The appropriate semiconductive material 39 may be located in spots or recesses 36 in plate 34 and contacted by conductive elements 37. Since plates 33 and 34 are already electrically isolated by resistance members 31 and 32, the required D.-C. bias is easily applied to diodes 37—39 merely by connecting a source of potential 38 between plates 33 and 34.

Instead of the discrete spot diodes of FIG. 4, a continuous strip diode as shown in FIG. 5 can provide the required capacitive loading. Thus a thin, narrow strip 41 of semiconductive material extending in groove 43 along the center line of plate 34 may be contacted by a conductive, knife edged, member 42 connected along the center line of plate 33. The junction capacity of the diode must be large enough to predominate over the inductance of member 42.

The structures of the present invention are ideally suited for use with the voltage controlled negative resistance junction diodes of the type described by L. Esaki in the Physical Review, January 15, 1958, page 603, or in the copending application of G. C. Dacey et al. Serial No. 855,426, field November 25, 1959. The general class of negative resistance devices of this type is now known either as Esaki diodes or tunnel diodes and are made of heavily doped semiconductive material suitably contacted to produce a p-n junction. Thus all or part of the diodes 37—39 of FIG. 4 or the strip diode 41—42 of FIG. 5 may be replaced by tunnel diodes. Not only do these diodes have a capacity across the junction sufficient to produce the capacitive loading and field distributions essential to the invention, but their negative resistance characteristic can simultaneously be used to produce negative resistance amplification with gain according to the principles described in the copending application of the applicant Hines hereof, Serial No. 1,212, filed January 8, 1960 or in U.S. Patent 2,777,906 granted January 15, 1957 to W. Shockley. The isolator action of ferrite elements 12 and 13 adds sufficient nonreciprocal positive resistance to assure that the loop gain will not exceed that for which an unstable condition results.

A special feature of the invention resides in the novel and useful function performed by resistive walls 31 and 32 in a negative resistance amplifier combination of the type described. It is well known that despite the simplicity of negative resistance amplifiers, their use has been limited by the low frequency instability which accompanies operation in high gain circuits. The low frequencies concerned include those also below the operating range of the device. However, in the present arrangements the magnetic and electric fields decay exponentially in the transverse direction away from the capacitive loading at the longitudinal center of the guiding structure with the high frequency fields decaying more rapidly than the low frequency fields. Therefore resistive walls 31 and 32 in either FIG. 4 or FIG. 5 occur where the high frequency fields are very weak and introduce insignificant attenuation at these frequencies. At low frequencies, however, walls 31 and 32 introduce a substantial shunt attenuation and if the net positive conductance per unit length so introduced exceeds the net negative conductance of the negative resistance elements at the low frequencies, there will be no problem with low frequency stability or in connecting power leads to the structure.

Amplification is obtained by applying the signal to be amplified to one end of the transmission line for propagation therealong in the direction in which low loss is introduced by the ferrite elements. The amplified signal is removed at the other end.

If operation as an oscillator is desired, the ferrite elements may be removed and the resulting instability produces oscillation of the negative resistance type at the frequency for which the structure is one-half wave length or odd multiples thereof, long. The resistive side walls continue to function in the manner defined above.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A broad band nonreciprocal device for electromagnetic wave energy comprising a wave guiding structure having at least first and second conductive boundaries, means including capacitive loading of said structure along a longitudinal portion thereof for reducing the phase velocity of said wave energy supported by said loaded structure to less than the phase velocity in free space, an element of ferrite material occupying a region of substantial transverse extent coextensive with and on at least one side of said loading means, and means for magnetically biasing said element inhomogeneously along said substantial transverse extent.

2. The device according to claim 1 wherein said loading means comprises an element of material having a dielectric constant of at least 100 extending fully between said first and second conductive boundaries.

3. The device according to claim 1 wherein said loading means reduces the phase velocity of said energy to at least one-third that of free space.

4. The device according to claim 1 wherein said loading means comprises a plurality of junction diodes having a substantial capacitance across the junction thereof connected between said first and second boundaries.

5. The device according to claim 1 wherein said loading means comprises a plurality of conductive projections extending from one conductive boundary toward the other conductive boundary.

6. The device according to claim 1 wherein said loading means comprises a strip of semiconductive material disposed along the center line of one conductive boundary and an elongated conductive contact for said material extending along the center line of the other conductive boundary.

7. A broad band nonreciprocal device for electromagnetic wave energy comprising a wave guiding structure having at least first and second conductive boundaries, means including an element of high dielectric constant material extending from said first to said second conductive boundaries along a longitudinal portion thereof for reducing the phase velocity of said wave energy supported by said loaded structure to the point at which the longitudinal and transverse magnetic field components of said wave energy are substantially equal in regions of substantial transverse extent on either side of said dielectric element, an element of ferrite material occupying a portion of substantial transverse extent coextensive with and on at least one side of said regions, and means for magnetically biasing said element inhomogeneously along said substantial transverse extent.

8. A broad band nonreciprocal device for electromagnetic wave energy comprising a wave guiding structure having top and bottom conductive boundaries and side boundaries of highly dissipative material, means including capacitive loading of said structure along a longitudinal portion thereof for reducing the phase velocity of said wave energy supported by said loaded structure to less than the phase velocity in free space, and an element of magnetically biased ferrite material occupying a region of substantial transverse extent coextensive with and on at least one side of said loading means.

9. A negative resistance device for electromagnetic wave energy comprising a wave guiding structure having top and bottom conductive boundaries, said structure having side boundaries of highly dissipative material, means coupled across said conductive boundaries having both a negative resistance and having a large capacitance for reducing the phase velocity of wave energy supported between said boundaries to less than the phase velocity in free space, and an element of magnetically biased ferrite material occupying a region between said boundaries.

10. The device according to claim 9 wherein said means coupled across said boundaries comprises a plurality of voltage controlled junction diodes.

11. A negative resistance device for electromagnetic wave energy comprising a wave guiding structure having top and bottom conductive boundaries, voltage controlled negative resistance junction diode structure coupled between said conductive boundaries, and means for stabilizing said negative resistance at low frequencies comprising boundaries of highly dissipative material connecting the side edges of said conductive boundaries.

References Cited in the file of this patent

UNITED STATES PATENTS

| 2,540,488 | Mumford | Feb. 6, 1951 |
| 2,777,906 | Shockley | Jan. 15, 1957 |
| 2,899,652 | Read | Aug. 11, 1959 |
| 2,903,656 | Weisbaum | Sept. 8, 1959 |
| 2,924,794 | Miller | Feb. 9, 1960 |

FOREIGN PATENTS

| 542,862 | Belgium | May 17, 1956 |

OTHER REFERENCES

Morgenthaler et al.: "Proceeding of the IRE," November 1957, pp. 1551–1552.

Skomal: "IRE Transactions on Microwave Theory and Techniques," January 1959, pp. 174–175.